(12) United States Patent
Furuyama

(10) Patent No.: US 7,639,585 B2
(45) Date of Patent: Dec. 29, 2009

(54) REPRODUCING SYSTEM SELECTING PART OF CONTENT DATA FROM POSITION RECORDED ON ONE RECORDING MEDIUM AND RECORDING SELECTED CONTENT DATA AT SAME POSITION ON SECOND RECORDING MEDIUM

(75) Inventor: Hiroaki Furuyama, Tokyo (JP)

(73) Assignee: Canon Kabuhsiki Kaisha, tokyo (JP)

( * ) Notice: Subject to any disclaimer, the term of this patent is extended or adjusted under 35 U.S.C. 154(b) by 574 days.

(21) Appl. No.: 11/007,000

(22) Filed: Dec. 7, 2004

(65) Prior Publication Data

US 2005/0141354 A1   Jun. 30, 2005

(30) Foreign Application Priority Data

Dec. 26, 2003   (JP)   ............................. 2003-434377

(51) Int. Cl.
  *G11B 7/00* (2006.01)
  *H04N 5/00* (2006.01)
(52) U.S. Cl. ....................... 369/84; 369/47.12; 386/125
(58) Field of Classification Search ....................... None
  See application file for complete search history.

(56) References Cited

U.S. PATENT DOCUMENTS

| | | | | |
|---|---|---|---|---|
| 4,823,333 | A * | 4/1989 | Satoh et al. | 369/84 |
| 4,985,784 | A * | 1/1991 | Tsuboi et al. | 386/109 |
| 5,805,547 | A * | 9/1998 | Yamamuro | 369/53.21 |
| 6,108,147 | A * | 8/2000 | Jeon | 360/15 |
| 6,246,655 | B1 * | 6/2001 | Miller | 369/84 |
| 6,941,488 | B2 * | 9/2005 | Ng et al. | 714/7 |
| 7,502,543 | B2 * | 3/2009 | Kato | 386/46 |
| 2005/0265168 | A1 * | 12/2005 | Kopf | 369/47.12 |
| 2007/0070828 | A1 * | 3/2007 | Watanabe et al. | 369/30.19 |

(Continued)

FOREIGN PATENT DOCUMENTS

| | | | |
|---|---|---|---|
| JP | 01307074 A | * | 12/1989 |
| JP | 06-111546 | | 4/1994 |
| JP | 11-259992 | | 9/1999 |

(Continued)

OTHER PUBLICATIONS

Translation of Mori, JP 2003-076500, published Mar. 14, 2003.*

(Continued)

*Primary Examiner*—Peter Vincent Agustin
(74) *Attorney, Agent, or Firm*—Canon USA Inc IP Div

(57) ABSTRACT

A reproducing system includes a reproducing unit for reproducing information data of a plurality of contents from a first disk-shaped recording medium, an external interface for outputting information data reproduced from the first disk-shaped recording medium to an external system so as to cause the external system to record the reproduced information data on a second disk-shaped recording medium, a selection unit for selecting, from among the plurality of contents recorded on the first disk-shaped recording medium, a content to be copied to the second disk-shaped recording medium, and a control unit for, in a copy mode in which information data of the content selected by the selection unit among information data recorded on the first disk-shaped recording medium is output to the external system and copied to the second disk-shaped recording medium, controlling the reproducing unit and the external system to record the information data to be copied on substantially the same recording position on the second disk-shaped recording medium as a physical recording position on the first disk-shaped recording medium where the information data to be copied is recorded.

9 Claims, 9 Drawing Sheets

FOREIGN PATENT DOCUMENTS

| | | | |
|---|---|---|---|
| JP | 11-259992 | A | 9/1999 |
| JP | 2000-173183 | | 6/2000 |
| JP | 2003076500 | A * | 3/2003 |
| JP | 2003-100016 | A | 4/2003 |

OTHER PUBLICATIONS

Kato, WO03/001801, published Jan. 3, 2003.*

* cited by examiner

FIG.3

| | SECTOR 0 | SECTOR 1 | SECTOR 2 | SECTOR 3 | SECTOR 4 | SECTOR 5 |
|---|---|---|---|---|---|---|
| Block 0 (B0) (PLAY LIST AREA) | | FAMILY TRIP | COMMUNITY EVENT | SCHOOL EVENT | (UNDEFINED) | (UNDEFINED) |
| | | B1⇒B5⇒B9 | B2⇒B4⇒B7 | B3⇒B6⇒B8 | | |
| Block 1 (B1) FAMILY TRIP IN WINTER | | VIDEO RECORDING AREA ※RECORDED | | | AUDIO RECORDING AREA ※RECORDED | POST- RECORDING AREA ※UNRECORDED |
| ⋮ | | | | | | |
| Block 20 (B20) (UNRECORDED) | | VIDEO RECORDING AREA ※UNRECORDED | AUDIO RECORDING AREA ※UNRECORDED | POST- RECORDING AREA ※UNRECORDED | VIDEO RECORDING AREA ※UNRECORDED | AUDIO RECORDING AREA ※UNRECORDED |

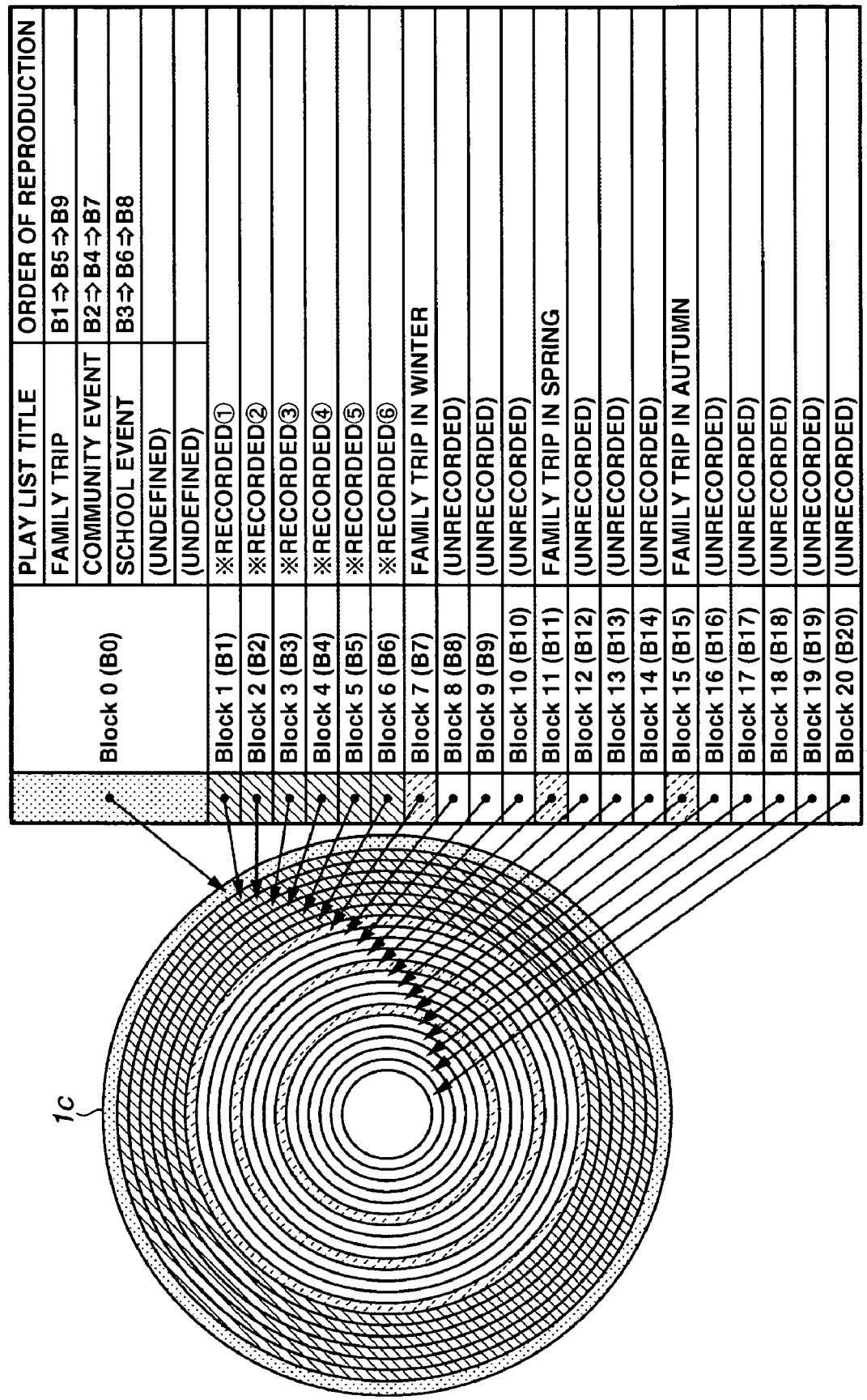

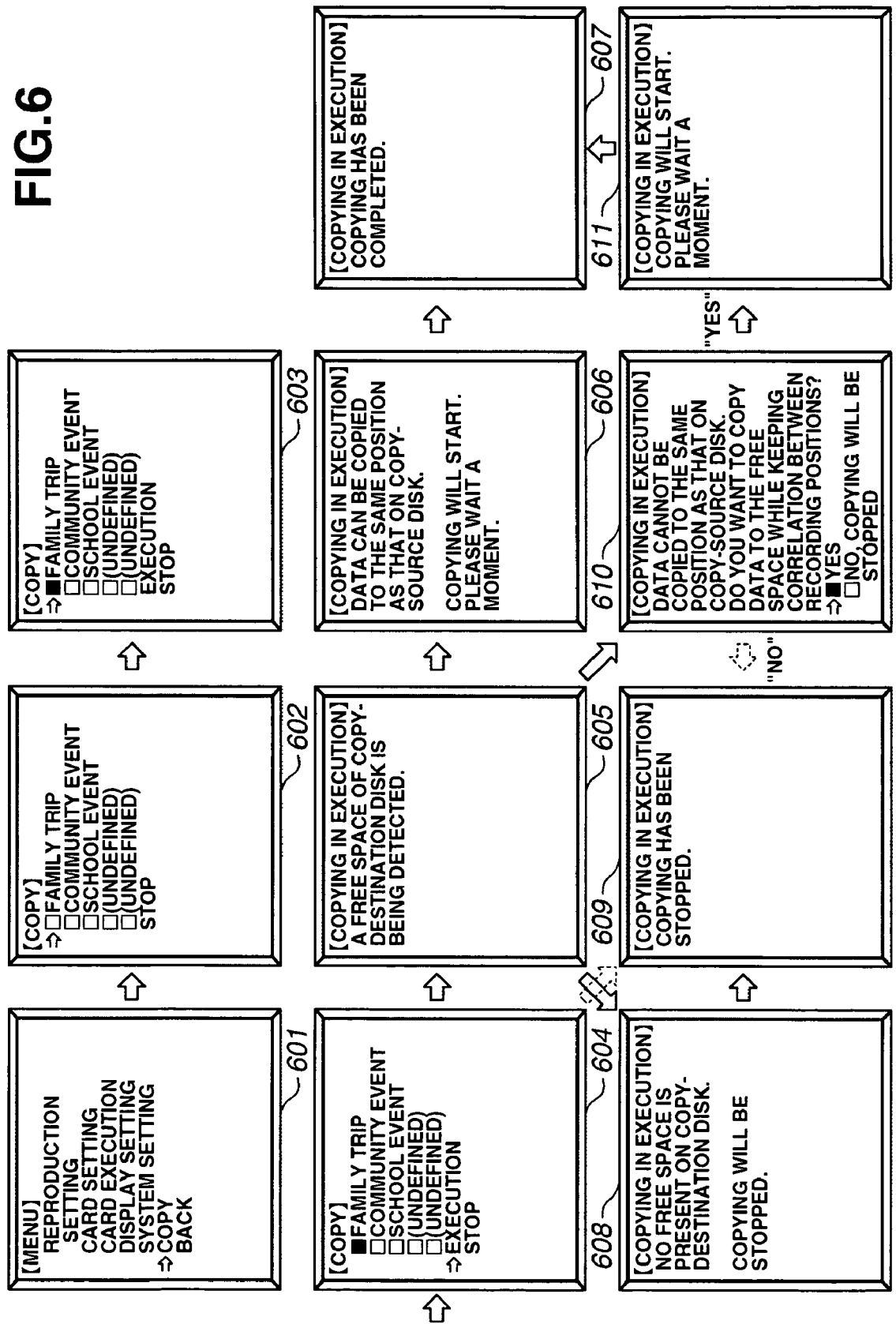

REPRODUCING SYSTEM SELECTING PART OF CONTENT DATA FROM POSITION RECORDED ON ONE RECORDING MEDIUM AND RECORDING SELECTED CONTENT DATA AT SAME POSITION ON SECOND RECORDING MEDIUM

CROSS-REFERENCE TO RELATED APPLICATIONS

This application claims priority from Japanese Patent Application No. 2003-434377 filed Dec. 26, 2003, which is hereby incorporated by reference herein.

BACKGROUND OF THE INVENTION

1. Field of the Invention

The present invention relates generally to a recording, storage and reproducing system and, more particularly, to a recording, storage and reproducing system for copy processing of information data recorded on a recording medium.

2. Description of Related Art

Reproducing systems for compressing video data or audio data and recording the same on a disk-shaped recording medium (rather than on a magnetic tape) have been developed. In Japanese Laid-Open Patent Application Hei 11-259992, for example, a method is disclosed for preliminarily reserving an area for post-recording on a disk.

Furthermore, Japanese Laid-Open Patent Application No. 2003-100016 discloses a method for copying data between disks, i.e., copying recorded data from one disk-shaped recording medium to another. In particular, the application discloses a method for selecting and then serially copying a plurality of content from a source disk and associated management information to a destination disk. In addition, a method for selecting and copying a plurality of folders each including a plurality of files to another disk is also known.

When a plurality of content recorded on separate areas of a disk are serially reproduced, the pickup head of the reproducing system has to be lifted and moved from one area to the other. Therefore, when a plurality of content are copied to a destination disk, it may be difficult to serially reproduce the content from the destination disk to another disk, depending on the physical recording positions of the recorded data.

Also, in cases where a plurality of content recorded on a destination disk are to be serially reproduced, a waiting time might occur. The waiting time is caused by a location that joins one content to another. Thus, the results of reproducing from the destination disk and the source disk are different.

SUMMARY OF THE INVENTION

The present invention is directed to a reproducing system. Among other advantages, when information data recorded on a first disk-shaped recording medium has been copied to a second disk-shaped recording medium, the copied information data can be appropriately reproduced from the second disk-shaped recording medium.

In an aspect of the present invention, there is provided a reproducing system comprising reproducing means for reproducing information data of a plurality of contents from a first disk-shaped recording medium, an external interface for outputting information data reproduced from the first disk-shaped recording medium to an external system so as to cause the external system to record the reproduced information data on a second disk-shaped recording medium, selection means for selecting, from among the plurality of contents recorded on the first disk-shaped recording medium, a content to be copied to the second disk-shaped recording medium, and control means for, in a copy mode in which information data of the content selected by the selection means among information data recorded on the first disk-shaped recording medium is output to the external system and copied to the second disk-shaped recording medium, controlling the reproducing means and the external system to record the information data to be copied on substantially the same recording position on the second disk-shaped recording medium as a physical recording position on the first disk-shaped recording medium where the information data to be copied is recorded.

The above and further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an example of contents recorded in blocks of a copy-source disk according to an embodiment of the present invention.

FIG. 5 is a diagram showing another example of contents recorded on a copy-destination disk according to an embodiment of the present invention.

FIG. 6 is a diagram showing various screens each of which is displayed on a liquid crystal panel of a reproducing-side system at the time of copying according to an embodiment of the present invention.

DETAILED DESCRIPTION OF THE EMBODIMENTS

Embodiments of the invention will be described in detail below with reference to the drawings.

Figure 1:
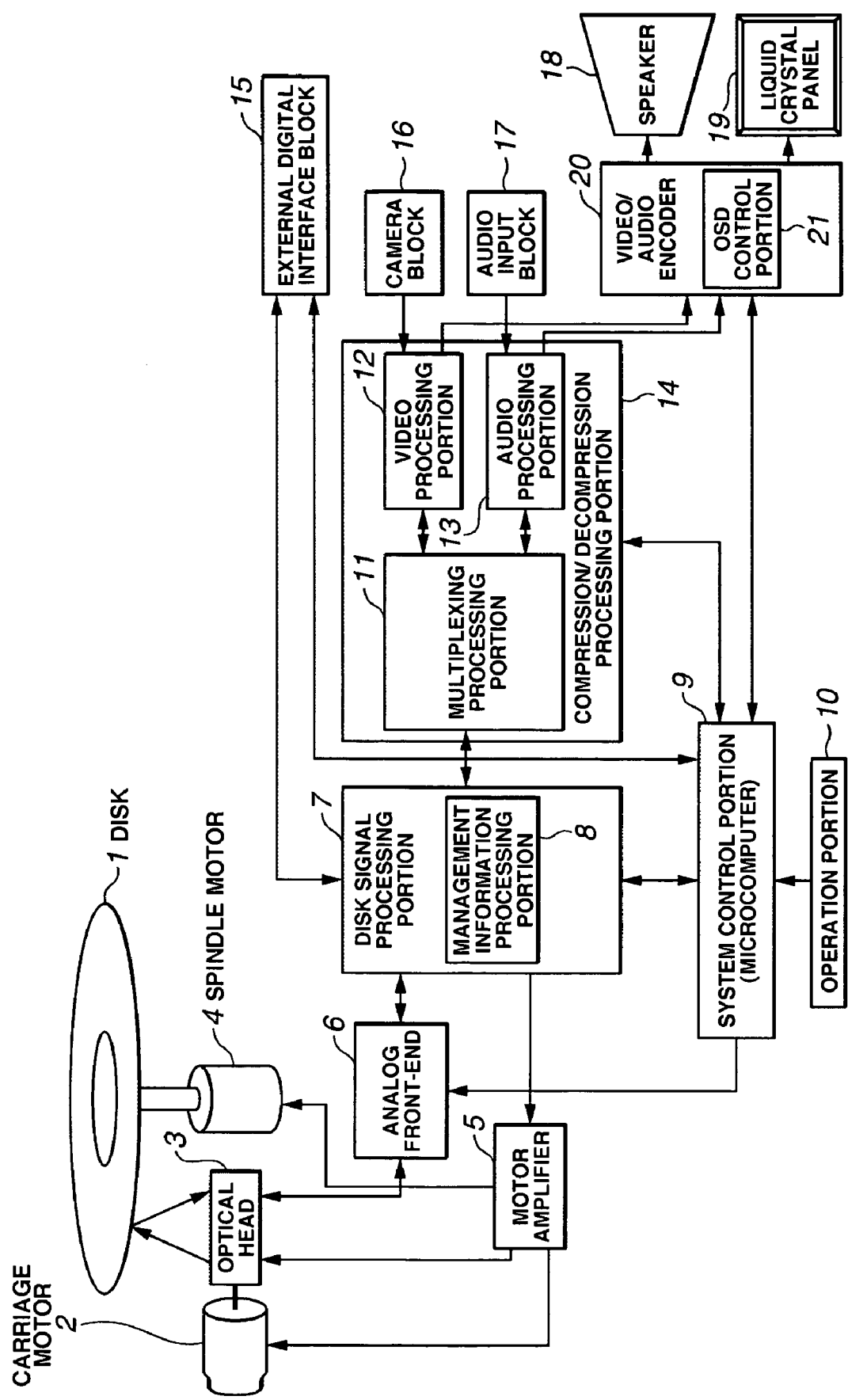
FIG. 1 is a block diagram of the configuration of a recording and reproducing system according to an exemplary embodiment of the invention.

FIG. 1 is a block diagram showing an example of the configuration of a recording and reproducing system according to an embodiment of the invention. In the present embodiment, a camera-integrated optical disk recording and reproducing system is taken as an example of the recording and reproducing system.

In FIG. 1, although not shown, a camera block 16 is composed of a photo-taking lens, a motor for driving the lens, a CCD (charge-coupled device), etc. The camera block 16 converts a captured image signal into digital video data and outputs the digital video data to a video processing portion 12 of a compression/decompression processing portion 14.

An audio input block 17 is composed of a sound-collecting microphone, etc. The audio input block 17 converts an audio signal obtained by the sound-collecting microphone into digital audio data and outputs the digital audio data to an audio processing portion 13 of the compression/decompression processing portion 14.

The video processing portion 12 applies DCT (discrete cosine transform) processing, quantization processing, etc., to digital video data received from the camera block 16 on the basis of a signal compression format, such as MPEG. Then, the video processing portion 12 outputs the digital video data compressed by the above processing operation to a multiplexing processing portion 11. In addition, the video processing portion 12 decompresses digital video data received from the multiplexing processing portion 11 on the basis of a format, such as MPEG, and outputs the decompressed digital video data to a video/audio encoder 20.

The audio processing portion 13 compresses digital audio data received from the audio input block 17 on the basis of a format, such as MPEG Audio, Dolby Digital or Linear PCM, and outputs the compressed audio data to the multiplexing processing portion 11. In addition, the audio processing portion 13 decompresses digital audio data received from the multiplexing processing portion 11 and outputs the decompressed audio data to the video/audio encoder 20.

The video/audio encoder 20 includes an OSD (on screen display) control portion 21. The video/audio encoder 20 converts digital video data received from the video processing portion 12 into data having a form suitable for display on a liquid crystal panel 19. The video/audio encoder 20 then adds, to the data, various pieces of display information such as characters, icons, etc. for display to a user. The pieces of display information are generated by the OSD control portion 21. The video processing portion 12 then outputs the digital video data with the various pieces of display information to the liquid crystal panel 19. In addition, the video/audio encoder 20 converts digital audio data received from the audio processing portion 13 into a data form suitable for phonetic output, and outputs the converted audio data to a speaker 18.

The multiplexing processing portion 11, at the time of recording, applies a multiplexing process to digital video data received from the video processing portion 12 and digital audio data received from the audio processing portion 13, and outputs mixed data obtained from the multiplexing process to a disk signal processing portion 7. In addition, the multiplexing processing portion 11, at the time of reproduction, divides digital data received from the disk signal processing portion 7 into digital video data and digital audio data. Then, the multiplexing processing portion 11 outputs the digital video data to the video processing portion 12 and outputs the digital audio data to the audio processing portion 13.

When a record instruction is received from the user via a user operation portion 10, a system control portion (microcomputer) 9 directs the disk signal processing portion 7 to add management information to the mixed data obtained from the multiplexing processing portion 11. Such management information includes but is not limited to the recording position (block number) of the information to be recorded (on a disk-shaped recording medium, hereinafter "disk"), titles of content, management files (play lists) for reproducing a plurality of content selectively and in orderly sequence, etc., and predetermined error correction blocks. The resultant mixed data is then output to analog front-end 6. Hereinafter, data received from the disk signal processing portion 7 to the analog front-end 6 is referred to as a "disk recording stream".

If an instruction for recording an externally input signal is received from the user (i.e., when in a copy mode), the disk signal processing portion 7 under the control of the system control portion 9 outputs data received from an external digital interface block 15 to the analog front-end 6.

In addition, when an instruction for reproduction is received from the operation portion 10, the disk signal processing portion 7 demodulates the disk reproducing stream received from the analog front-end 6 and applies a predetermined error correction process and a descrambling process to the demodulated disk reproducing stream. Then, the disk signal processing portion 7 outputs the thus-processed digital data to the compression/decompression processing portion 14 and the external digital interface block 15. At relatively the same time, the disk signal processing portion 7 separates the management information from the digital data and outputs the separated management information to the system control portion 9.

The external digital interface block 15 transmits and receives data in compliance with a standard, such as USB or IEEE1394, and outputs and inputs video and audio signals, control commands, etc., to and from an external system in accordance with instructions from the system control portion 9.

The disk signal processing portion 7 generates servo system signals for controlling a spindle motor 4, an optical head 3 and a carriage motor 2 on the basis of a tracking error signal received from the analog front-end 6, and outputs the servo system signals to a motor amplifier 5.

The analog front-end 6 under the control of the system control portion 9 modulates (analog) a disk recording stream received from the disk signal processing portion 7, applies amplification processing to the disk recording stream and outputs the analog-modulated disk recording stream to the optical head 3. At relatively the same time, the analog front-end 6 controls laser emission of the optical head 3.

In addition, when data recorded on the disk 1 is read out, the analog front-end 6 amplifies a signal received from the optical head 3, which corresponds to reflected light from the disk 1 receiving laser emission. Then, the analog front-end 6 digitizes the amplified signal and outputs the digitized signal as a disk reproducing stream to the disk signal processing portion 7.

Furthermore, the analog front-end 6 generates a tracking error signal, etc., from a signal received from the optical head 3, which corresponds to the intensity of reflected light from the disk 1 receiving laser emission. Then, the analog front-end 6 digitizes the tracking error signal, etc., and outputs the digitized tracking error signal, etc., to the disk signal processing portion 7.

The motor amplifier 5 generates a spindle control signal, a focus tracking control signal and a carriage control signal on the basis of the servo system signals received from the disk signal processing portion 7, and outputs these signals to the spindle motor 4, the optical head 3 and the carriage motor 2, respectively, to control them.

The spindle motor 4 rotates the disk 1 mounted thereon at a predetermined rotational speed on the basis of the spindle control signal received from the motor amplifier 5.

The optical head 3 emits a laser beam from an irradiation portion (not shown) to a predetermined position of the disk 1 on the basis of the focus tracking control signal received from the motor amplifier 5 and the control signal received from the analog front-end 6. In addition, the optical head 3 receives a laser beam emitted from the irradiation portion and reflected from the surface of the disk 1, reads the pits of the disk 1 on the basis of the received laser beam, and outputs to the analog front-end 6 a signal corresponding to the intensity of the reflected laser beam.

The carriage motor 2 moves the optical head 3 to a predetermined position on a straight line connecting the center of the disk 1 to a point on the circumference thereof, so that the optical head 3 can emit a laser beam to a predetermined pit track of the disk 1 to read data recorded on the disk 1.

Although not shown, the operation portion 10 includes a camera-system operation portion composed of various switches related to camera system operations (zoom key, focus key, etc.), a reproducing-system operation portion composed of various switches related to reproducing system operations and system operations (up key, down key, menu key, setting key, play key, FF/REW key, stop key, START/STOP key, etc.), and a power-source mode switch portion for selecting a power source mode of the system (camera mode, reproduction mode, off mode). The operation portion 10 outputs instructions from the user to the system control portion 9.

The system control portion 9 is composed of a microcomputer or the like that comprehensively controls various functions of the system. Thus, the system control portion 9 controls operations of the whole of the camera-integrated optical disk recording and reproducing system, including the analog front-end 6, the disk signal processing portion 7, the compression/decompression processing portion 14, the external digital interface block 15 and the video/audio encoder 20, on the basis of signals corresponding to instructions from the user.

The process of using the camera-integrated optical disk recorder and the reproducing system of FIG. 1 to copy portions of recorded data from one disk to another in accordance with an embodiment of the present invention is now described.

Figure 8:
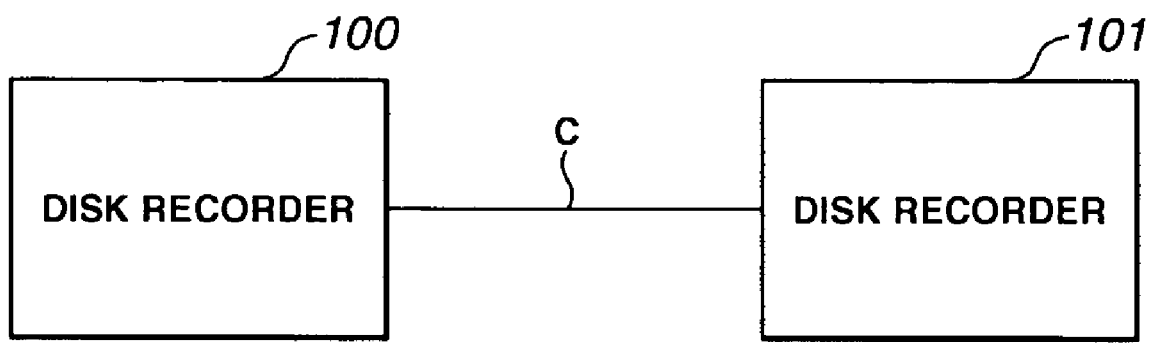
FIG. 8 is a block diagram showing the configuration of a system having two disk recorders connected to each other according to an embodiment of the present invention.

FIG. 8 is a block diagram showing an example of the configuration of a system having two disk recorders (recording and reproducing systems) connected to each other. In FIG. 8, reference numerals 100 and 101 each denote a disk recorder having the same configuration as that of the recording and reproducing system shown in FIG. 1. The external digital interface blocks 15 (FIG. 1) of the two disk recorders 100 and 101 are connected to each other via a cable C. Note that cable C may be either a physical or wireless connection.

In the example shown in FIG. 8, it is assumed that the disk recorder 100 is a reproducing-side system and the disk recorder 101 is a recording-side system. In the present embodiment, as will be described below, the system control portion 9 of the disk recorder 100 (reproducing side) serves as the controller for the disk recorder 101 (recording side), so that data reproduced by the disk recorder 100 can be copied to another disk mounted in the disk recorder 101.

Figure 2:
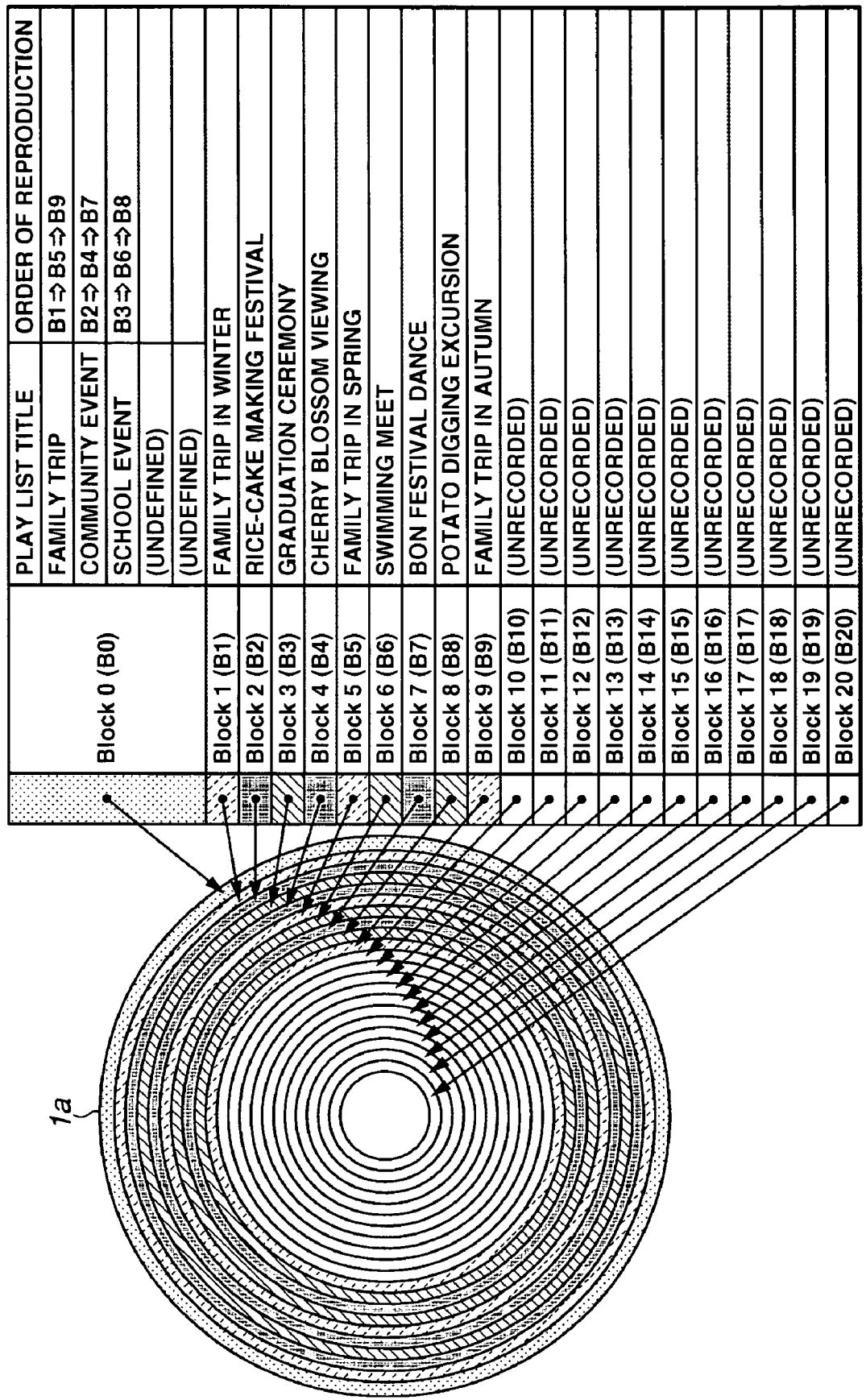
FIG. 2 is a diagram showing an example of contents recorded on a copy-source disk according to an embodiment of the present invention.

FIG. 2 is a diagram schematically showing an example of contents recorded on a copy-source disk 1a in accordance with an embodiment of the present invention. Twenty-one blocks B0 to B20 are defined on concentric circles of the disk 1a. On the outermost block B0, management files (play lists) for reproducing a plurality of contents selectively and in orderly sequence are recorded. On the blocks B1 to B20, which are formed on the inward side of the block B0 (the block B20 being innermost), contents, titles thereof, recording positions thereof, etc., are recorded.

FIG. 3 is a diagram schematically showing an example of recording positions of contents recorded on the blocks B0 to B20 provided on the disk 1a of FIG. 2. As shown in FIG. 3, each of the blocks B0 to B20 is divided into six parts, i.e., the first to sixth sectors (sector 0 to sector 5 in FIG. 3).

With regard to the block B0, block number and play list attributes are recorded on the first sector (sector 0). On the second to sixth sectors (sector 1 to sector 5), titles of play lists, selected content numbers and orders of reproduction of contents are recorded.

With regard to each of the blocks B1 to B20, block number, title of a content and various pieces of management information are recorded on the first sector (sector 0). On the second to fourth sectors (sector 1 to sector 3) of the block B1, a video recording area is defined. On the fifth sector (sector 4) of the block B1, an audio recording area is defined. On the sixth sector (sector 5), a post-recording area is defined. Thus, signals corresponding to the respective recording areas are recorded on the second to sixth sectors of the block B1. The post-recording area is used for recording data of post-recording sound when the post-recording sound is additionally recorded after a video image or sound has been once recorded on the disk 1a. Furthermore, in each of the blocks B0 to B20, the correlation between physical recording positions of the first to sixth sectors is kept. Incidentally, it is preferable that, in the blocks B1 to B20, the video and audio recording areas and the post-recording area are alternately arranged.

Control operation performed when data recorded on the disk 1a is copied to another disk is described below.

Figure 7A:
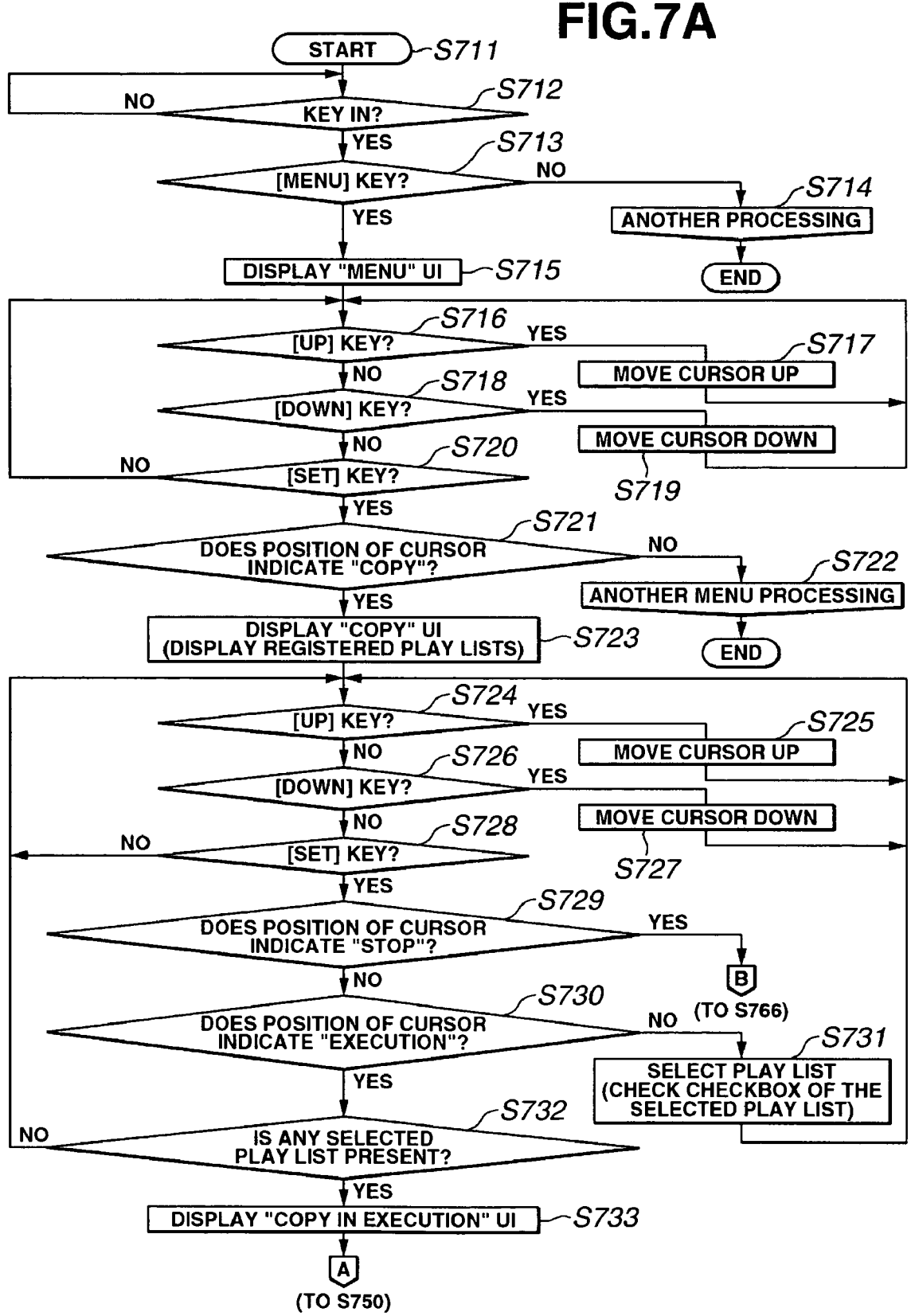
FIGS. 7A and 7B are flow charts illustrating a control operation of the reproducing-side system at the time of copying according to an embodiment of the present invention.
Figure 7B:
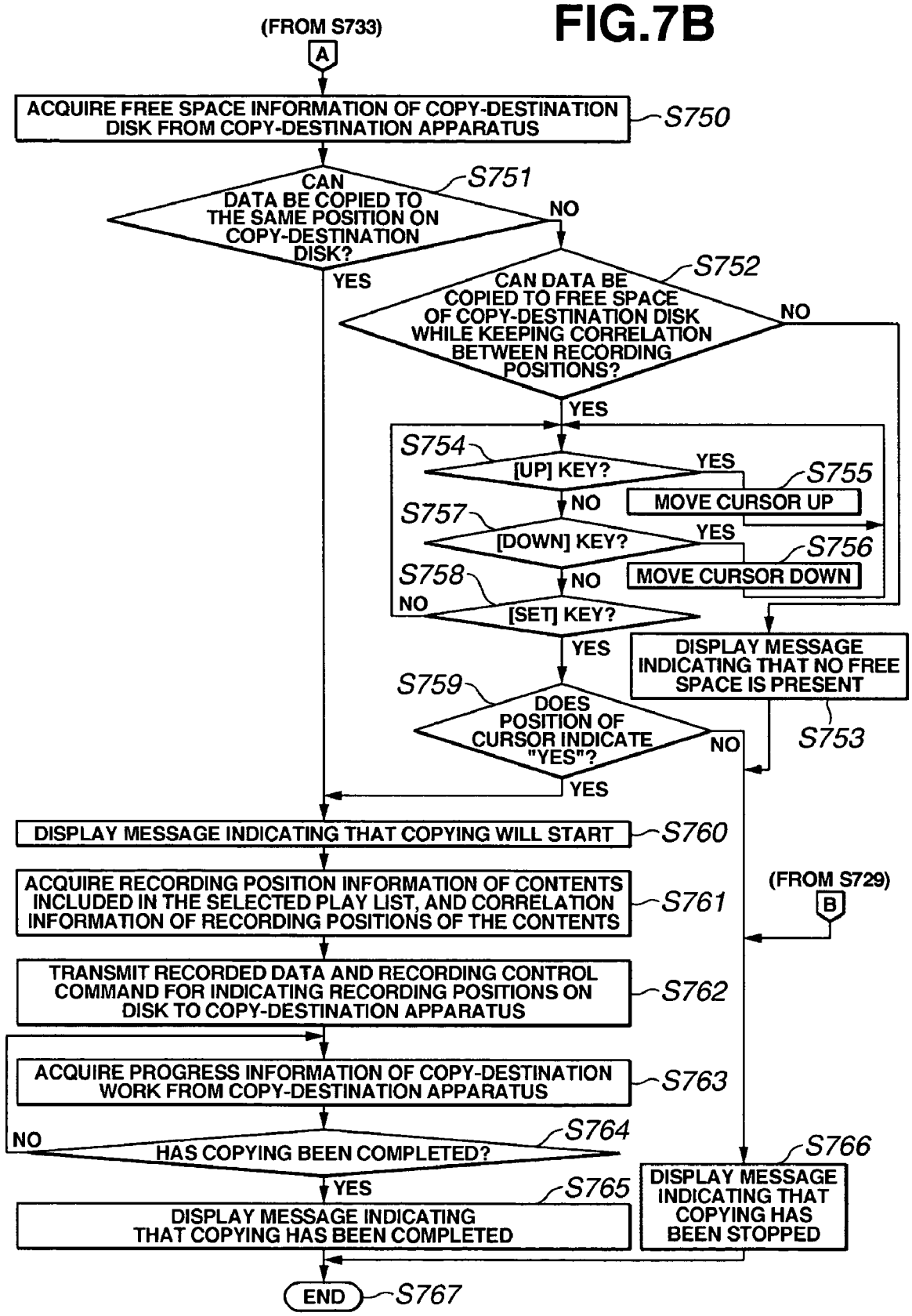

FIGS. 7A and 7B are flow charts illustrating an example of a control operation of the system control portion 9 of the disk recorder (the recording and reproducing system shown in FIG. 1) 100 serving as a reproducing-side system, which is performed when data recorded on the copy-source disk 1a (FIG. 2) is copied to a copy-destination disk.

Figure 4:
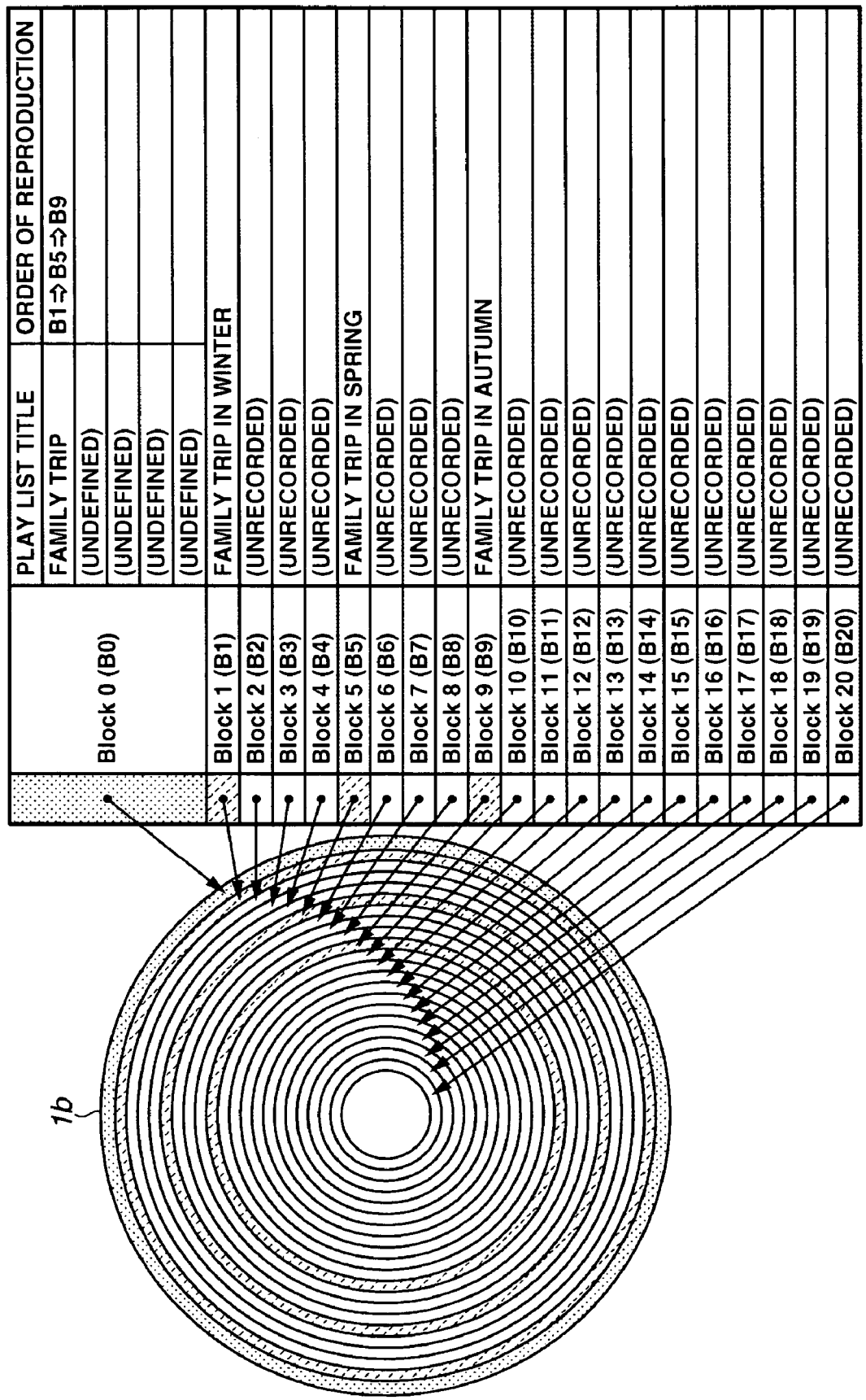
FIG. 4 is a diagram showing an example of contents recorded on a copy-destination disk according to an embodiment of the present invention.

FIG. 6 is a diagram showing an example of UI (user interface) screens, each of which is displayed on the liquid crystal panel 19 of the disk recorder 100 when data recorded on the copy-source disk 1a is copied to a copy-destination disk. FIGS. 4 and 5 are diagrams schematically showing respective examples of content recorded on copy-destination disks after execution of copying of data recorded on the disk 1a.

Referring first to FIG. 7A, the system control portion 9 starts processing at step S711. Here, the reproducing-side disk recorder (camera-integrated optical disk recording and reproducing system) 100 is in the reproduction mode and the copy-source disk 1a of FIG. 2 is mounted in the reproducing-side disk recorder 100.

At step S712, the system control portion 9 waits for a key input from the operation portion 10. If the key input is detected, the system control portion 9 proceeds to step S713. At step S713, the system control portion 9 checks to determine if the key input is a menu key. If the key input is the menu key, the system control portion 9 proceeds to step S715. Otherwise, the system control portion 9 proceeds to step S714, where the system control portion 9 initiates a different system processing unrelated to the present invention.

Referring back to step S715, when the menu key is manipulated, the system control portion 9 controls the video/audio encoder 20 to cause a "menu" UI 601 to be displayed on the liquid crystal panel 19. It should be noted that, in the following discussion, the operation for causing a UI to be displayed on the liquid crystal panel 19 is also performed by the system control portion 9 controlling the video/audio encoder 20, similar to the step S715.

Then, if it is determined at step S716 that the key input for an up key has been detected at the operation portion 10, the system control portion 9 proceeds to step S717. At step S717, the system control portion 9 causes a menu cursor displayed in the "menu" UI 601 to move up. Then, the system control portion 9 returns to step S716.

At step S716, if the key input for the up key has not been detected at the operation portion 10, the system control portion 9 proceeds to step S718. At step S718, if the key input for a down key has been detected at the operation portion 10, the system control portion 9 proceeds to step S719. At step S719, the system control portion 9 causes the menu cursor displayed in the "menu" UI 601 to move down. Then, the system control portion 9 returns to step S716.

Otherwise, at step S718, if the key input for the down key has not been detected at the operation portion 10, the system control portion 9 proceeds to step S720. At step S720, if the key input for a set key has been detected at the operation portion 10, the system control portion 9 proceeds to step S721. Otherwise, at step S720, the system control portion 9 returns to step S716, where the system control portion 9 repeats steps S716 to S720 until the key input for the set key is detected. Accordingly, during the process of displaying the "menu" UI 601, key inputs other than the up key, the down key and the set key are made ineffective.

After the key input for the set key has been detected, at step S721, the system control portion 9 checks for the position of the menu cursor. If the position of the menu cursor indicates "copy", the system control portion 9 proceeds to step S723. Otherwise, the system control portion 9 proceeds to step S722, where the system control portion 9 initiates a different processing operation that is unrelated to the present invention.

At step S723, the system control portion 9 causes a "copy" UI 602 to be displayed on the liquid crystal panel 19 so as to show the above-described registered play lists to the user. In this case, in order to prevent individual contents from being separately copied, only play lists are displayed. As a result, copying can be performed while keeping recording positions on the copy-source disk 1a and the correlation between contents.

At step S724, if the key input for the up key has been detected at the operation portion 10, the system control portion 9 proceeds to step S725. At step S725, the system control portion 9 causes a menu cursor displayed in the "copy" UI 602 to move up. Then, the system control portion 9 returns to step S724.

At step S724, if the key input for the up key has not been detected at the operation portion 10, the system control portion 9 proceeds to step S726. At step S726, if the key input for the down key has been detected at the operation portion 10, the system control portion 9 proceeds to step S727. At step S727, the system control portion 9 causes the menu cursor displayed in the "copy" UI 602 to move down, after which the system control portion 9 returns to step S724.

At step S728, if the key input for the set key has been detected at the operation portion 10, the system control portion 9 proceeds to step S729, where the current position of the menu cursor is determined. If the position of the menu cursor indicates "stop", the system control portion 9 proceeds to step S766 shown in FIG. 7B. At step S766, the system control portion 9 causes a message 609 indicative of stoppage of copying to be displayed on the liquid crystal panel 19. Then, the system control portion 9 proceeds to step S767. At step S767, processing is completed by the system control portion 9.

If the position of the menu cursor does not indicate "stop" at step S729, the system control portion 9 proceeds to step S730. At step S730, the system control portion 9 checks for the current position of the menu cursor. If the position of the menu cursor indicates "execution", the system control portion 9 proceeds to step S732. Otherwise, the system control portion 9 proceeds to step S731. At step S731, the system control portion 9 causes a "copy" UI 603 in which a play list selection checkbox has been checked to be displayed on the liquid crystal panel 19. Then, the system control portion 9 returns to step S724.

At step S732, the system control portion 9 checks to determine if any selected play list is present. If no selected play list is present, the system control portion 9 returns to step S724 because copying cannot be performed. If a selected play list is present, the system control portion 9 proceeds to step S733. At step S733, the system control portion 9 causes a message 605 indicative of copying in execution to be displayed on the liquid crystal panel 19. (That is, the screen displayed on the liquid crystal panel 19 shifts from the "copy" UI 604 to the message 605.)

At the next step S750 shown in FIG. 7B, the system control portion 9 acquires free space information about a copy-destination disk from the copy-destination disk recorder 101.

At step S751, the system control portion 9 checks to determine if data recorded on the copy-source disk 1a corresponding to the selected play list can be copied to the same position on the copy-destination disk, on the basis of the free space information acquired at the step S750. If the data can be copied to the same position, the system control portion 9 proceeds to step S760. At step S760, the system control portion 9 causes a message 606 indicative of starting of copying to be displayed on the liquid crystal panel 19. Then, the system control portion 9 proceeds to step S761. Processing to be performed by the system control portion 9 when it is determined at step S751 that the data cannot be copied to the same position is described below.

At step S761, the system control portion 9 acquires recording position information of content included in the selected play list and correlation information of recording positions of the content from the copy-source disk 1a. At the next step S762, the system control portion 9 transmits, to the copy-destination disk recorder 101, data recorded on the copy-source disk 1a and a recording control command for designating a recording position on the copy-destination disk. By this transmission, the recording position on the copy-destination disk is designated in the copy-destination disk recorder 101.

At step S763, the system control portion 9 acquires progress information about copy-destination work from the copy-destination disk recorder 101. At step S764, the system control portion 9 checks to determine if copying has been completed. If copying has not yet been completed, the system control portion 9 returns to step S763, where the system control portion 9 repeats steps S763 and S764 until copying is completed. If copying has been completed, the system control portion 9 proceeds to step S765. At step S765, the system control portion 9 causes a message 607 indicative of completion of copying to be displayed on the liquid crystal panel 19. Then, the system control portion 9 proceeds to step S767. At step S767, the system control portion 9 ends the process.

FIG. 4 is a diagram schematically showing an example of content recorded on a copy-destination disk 1b in which data has been copied to the same position as that on the copy-source disk 1a. In FIG. 4, only a play list entitled "Family Trip" and contents selected on that play list recorded on the copy-source disk 1a are copied to the same recording position on the copy-destination disk 1b as that on the copy-source disk 1a of FIG. 2.

At step S751, if data recorded on the copy-source disk 1a cannot be copied to the same position on a copy-destination disk, the system control portion 9 proceeds to step S752. At step S752, the system control portion 9 checks to determine if data recorded on the copy-source disk 1a can be copied to a free space of the copy-destination disk while keeping the correlation of recording positions between contents.

FIG. 5 is a diagram schematically showing an example of content recorded on a copy-destination disk 1c in which data has been copied while keeping the correlation of recording positions between contents with respect to the copy-source disk 1a. In FIG. 5, before data is copied to the copy-destination disk 1c, blocks B1 to B6 have data already recorded therein and blocks B7 to B20 have no data recorded therein. Accordingly, although the designated play list data cannot be copied to the same recording position as that on the copy-source disk 1a, that data can be copied to the copy-destination disk 1c while keeping the correlation of recording positions between contents included in the play list "Family Trip". In the case of the example shown in FIG. 5, the play list "Family Trip" and contents selected on that play list recorded on the copy-source disk 1a are copied to blocks different from those of the copy-source disk 1a while the correlation of recording positions with respect to the copy-source disk 1a is kept.

At step S752, if data recorded on the copy-source disk 1a can be copied to a free space of the copy-destination disk while keeping the correlation of recording positions between contents, the system control portion 9 causes a "copy in execution" UI 610 to be displayed on the liquid crystal panel 19 (screen displayed shifts from the "copy in execution" UI 605 to the "copy in execution" UI 610), and proceeds to step S754. At step S754, the system control portion 9 awaits user input via the operation portion 10.

At step S752, if data cannot be copied because there is no free space on the copy-destination disk, the system control portion 9 proceeds to step S753. At step S753, the system control portion 9 causes a message 608 indicating that no free space is present to be displayed on the liquid crystal panel 19 (i.e., screen displayed shifts from the "copy in execution" UI 605 to the message 608). Then, the system control portion 9 proceeds to step S766. At step S766, the system control portion 9 causes a message 609 indicating that copying has been stopped to be displayed on the liquid crystal panel 19. Then, the system control portion 9 proceeds to step S767. At step S767, the system control portion 9 ends the process.

At step S754, if the key input for the up key has been detected at the operation portion 10, the system control portion 9 proceeds to step S755. At step S755, the system control portion 9 causes a menu cursor displayed in the "copy in execution" UI 610 to move up. Then, the system control portion 9 returns to step S754.

Otherwise, at step S754, if the key input for the up key has not been detected at the operation portion 10, the system control portion 9 proceeds to step S757. At step S757, if the key input for the down key has been detected at the operation portion 10, the system control portion 9 proceeds to step S756. At step S756, the system control portion 9 causes the menu cursor displayed in the "copy in execution" UI 610 to move down. Then, the system control portion 9 returns to step S754.

Then, at step S758, if the key input for the set key has been detected at the operation portion 10, the system control portion 9 proceeds to step S759, where the system control portion 9 checks for the current position of the menu cursor. If the position of the menu cursor does not indicate "yes", the system control portion 9 proceeds to step S766. At step S766, the system control portion 9 causes the message 609 indicative of stoppage of copying to be displayed on the liquid crystal panel 19. Then, the system control portion 9 proceeds to step S767. At step S767, the system control portion 9 ends processing work.

Otherwise, at step S759, if the position of the menu cursor indicates "yes", the system control portion 9 proceeds to step S760. At step S760, the system control portion 9 causes a message 611 indicative of starting of copying to be displayed on the liquid crystal panel 19. Then, the system control portion 9 proceeds to step S761. Subsequently, the system control portion 9 performs above-described steps S761 to S767 until copying is ended.

As described above, according to the present embodiment, when contents, recorded on the copy-source disk 1a, of a play list selected by the user among play lists for reproducing a plurality of contents selectively and in orderly sequence are copied to a copy-destination disk, the system control portion 9 of the reproducing-side disk recorder 100 checks to determine if data of contents of the selected play list can be copied to the same position on the copy-destination disk, on the basis of free space information of the copy-destination disk (mounted in the recording-side disk recorder 101). If data can be copied to the same position, the system control portion 9 acquires, from the copy-source disk 1a, recording position information of contents included in the selected play list and correlation information of recording positions of the contents, and transmits, to the recording-side disk recorder 101, data recorded on the copy-source disk 1a corresponding to the selected play list and a recording control command for designating recording positions on the copy-destination disk.

Accordingly, the contents are recorded in the same recording position on the copy-destination disk 1b and the copy-source disk 1a.

Therefore, for example, when data is reproduced from the copy-destination disk 1b, disadvantages of conventional systems are avoided. Content (a main video image and a main sound) is reproducible that accords with post-recording sounds. Moreover, there is no occurrence of waiting time at a joint between various contents etc. As described above, in accordance with the present embodiment, data recorded on the copy-destination disk 1b can be reproduced in the same condition as that of the copy-source disk 1a.

Furthermore, if data for content designated by a play list selected by the user cannot be copied to the same position on the copy-destination disk, the system control portion 9 of the reproducing-side disk recorder 100 checks to determine if the data can be copied to a free space of the copy-destination disk while keeping correlation of recording positions of the contents. If the data can be copied while keeping correlation of recording positions of the contents, the system control portion 9 transmits, to the recording-side disk recorder 101, data recorded on the copy-source disk 1a corresponding to the selected play list and a recording control command for designating recording positions on the copy-destination disk.

Accordingly, the contents are recorded in blocks of the copy-destination disk 1c different from those of the copy-source disk 1a while keeping correlation of recording positions of the contents with respect to the copy-source disk 1a.

Therefore, the present embodiment makes it possible to reproduce data recorded on the copy-destination disk 1c in the same condition as that of the copy-source disk 1a.

The present invention can also be achieved by providing a computer (CPU or MPU) included in a system connected to various devices with a program code of software for realizing the functions of the above-described embodiment, and causing the computer of the system to operate the various devices in accordance with the stored program code.

In this case, the program code of software itself realizes the functions of the above-described embodiment. The program code itself and a means for providing the computer with the program code, for example, a storage medium storing the program code, each constitute the invention. The storage medium storing the program code includes a flexible disk, a hard disk, an optical disk, a magneto-optical disk, a CD-ROM, a magnetic tape, a non-volatile memory card, a ROM, etc.

Furthermore, besides the program code provided to the computer being executed to achieve the functions of the above-described embodiment, the present invention includes the program code acting in cooperation with an OS (operating system), another application software or the like running on the computer to realize the functions of the above-described embodiment.

Moreover, the present invention also includes a CPU or the like contained in a function expansion board inserted into the computer or in a function expansion unit connected to the computer, the function expansion board or the function expansion unit having a memory in which the program code provided to the computer is written, the CPU or the like performing an actual process in whole or in part according to instructions of the program code to realize the functions of the above-described embodiment.

The invention has been described in detail with particular reference to certain embodiments thereof, but it will be understood that variations and modifications can be effected within the scope of the invention as described above, and as noted in the appended claims, by a person of ordinary skill in the art without departing from the scope of the invention.

What is claimed is:

1. A reproducing apparatus comprising:
   reproducing means for reproducing a plurality of pieces of video data and a plurality of playlists indicating a reproduction order of the video data from a first recording medium;
   an external interface for outputting the pieces of video data and the plurality of playlists reproduced from the first recording medium to a recording device so as to cause the recording device to record the reproduced video data and the plurality of playlists on a second recording medium;
   selection means for selecting a playlist, from among the plurality of playlists recorded on the first recording medium;
   an instruction unit that provides an instruction by a user;
   discriminating means for, in accordance with an instruction for copying the plurality of video data designated by the selected playlist from the first recording medium to the second recording medium, discriminating whether the plurality of video data designated by the selected playlist can be recorded on substantially the same recording position on the second recording medium as a physical recording position on the first recording medium where the plurality of video data designated by the selected playlist is recorded; and
   control means for controlling the recording position of the video data on the second recording medium according to a discrimination result of the discrimination means in the copy mode,
   wherein if the discriminating means discriminates that the plurality of video data can be recorded on substantially the same recording position, the control means controls the recording device to record the plurality of video data designated by the selected playlist on substantially the same recording position on the second recording medium as the physical recording position on the first recording medium where the video data designated by the selected playlist is recorded in the copy mode, and
   wherein if the discriminating means discriminates that the plurality of video data cannot be recorded on substantially the same recording position, the control means inquires whether the plurality of video data designated by the selected playlist are to be copied on a free space of the second recording medium, after the inquiring, controls the recording device to record the plurality of video data on the free space of the second recording medium in accordance with an instruction for executing the copying provided by the instruction unit, and stops the copying in accordance with an instruction for stopping the copying provided by the instruction unit.

2. A reproducing apparatus according to claim 1, wherein, in the copy mode, the control means controls the reproducing means to reproduce the video data designated by the playlist selected by the selection means.

3. A reproducing apparatus according to claim 2, further comprising a display device, wherein the control means causes the display device to display information on the playlists that can be copied to the second recording medium.

4. A reproducing apparatus according to claim 1, wherein the control means generates control data for controlling a recording position of the video data on the second recording medium, and causes the external interface to output the generated control data to the recording device.

5. A reproducing apparatus according to claim 1, wherein the video data includes coded image data, and wherein the external interface outputs the coded image data to the recording device.

6. A reproducing apparatus according to claim 1, wherein if the discriminating means discriminates that the plurality of video data cannot be recorded on substantially the same recording position, the control means inquires whether the copying of the plurality of video data designated by the selected playlist is to be executed, after the inquiring, controls the recording device to record the plurality of video data on a free space of the second recording medium while keeping a relative recording position of the plurality of video data designated by the selected playlist on the first recording medium in accordance with an instruction for executing the copying provided by the instruction unit, and stops the copying in accordance with an instruction for stopping the copying provided by the instruction unit.

7. A reproducing apparatus comprising:
   reproducing means for reproducing a plurality of pieces of video data and a plurality of playlists indicating a reproduction order of the video data from a first recording medium;
   an external interface for outputting the video data and the plurality of playlists reproduced from the first recording medium to a recording device so as to cause the recording device to record the reproduced video data and the plurality of playlists on a second recording medium;
   selecting means for selecting one of the plurality of playlists on the first recording medium;
   an instruction unit that provides an instruction by a user;
   discriminating means for, in accordance with an instruction for copying the plurality of video data designated by the selected playlist from the first recording medium to the second recording medium, discriminating whether the plurality of video data designated by the selected playlist can be recorded on substantially the same recording position on the second recording medium as a physical recording position on the first recording medium where the plurality of video data designated by the selected playlist is recorded; and control means for controlling the recording position of the video data on the second recording medium according to a discrimination result of the discrimination means in the copy mode, wherein when the discriminating means discriminates that the plurality of video data can be recorded on substantially the same recording position, the control means controls the recording device to record the plurality of video data designated by the selected playlist on substantially the same recording position on the second recording medium as a physical recording position on the first recording medium where the video data designated by the selected playlist is recorded in the copy mode, and wherein when the discriminating means discriminates that the video data cannot be recorded on substantially the same recording position, the control means inquires whether the plurality of video data designated by the selected playlist are to be copied on a free space of the second recording medium, after the inquiring, controls the recording device to record the plurality of video data on a free space of the second recording medium while keeping a relative recording position of the plurality of video data designated by the selected playlist on the first recording medium in accordance with an instruction for executing the copying provided by the instruction unit, and stops the copying in accordance with an instruction for stopping the copying provided by the instruction unit.

8. A reproducing method comprising:

a reproducing step of reproducing a plurality of pieces of video data and a plurality of playlists indicating a reproduction order of the video data from a first recording medium;

an output step of outputting the pieces of video data and the plurality of playlists reproduced from the first recording medium to a recording device so as to cause the a recording device to record the reproduced video data and the plurality of playlists on a second recording medium;

a selection step of selecting a playlist, from among the plurality of playlists recorded on the first recording medium;

providing an instruction by a user;

discriminating, in accordance with an instruction for copying the plurality of video data designated by the selected playlist from the first recording medium to the second recording medium, whether the plurality of video data designated by the selected playlist can be recorded on substantially the same recording position on the second recording medium as a physical recording position on the first recording medium where the plurality of video data designated by the selected playlist is recorded; and controlling the recording position of the video data on the second recording medium according to a discrimination result of the discriminating step in the copy mode, wherein if it is descriminated in the discriminating step that the plurality of video data can be recorded on substantially the same recording position, controlling the recording device to record the plurality of video data designated by the selected playlist on substantially the same recording position on the second recording medium as the physical recording position on the first recording medium where the video data designated by the selected playlist is recorded in the copy mode, and wherein if it is discriminated in the discriminating step that the plurality of video data cannot be recorded on substantially the same recording position, inquiring whether the plurality of video data designated by the selected playlist are to be copied on a free space of the second recording medium, after the inquiring step, controlling the recording device to record the plurality of video data on the free space of the second recording medium in accordance with an instruction for executing the copying provided in the providing step, and stopping the copying in accordance with an instruction for stopping the copying provided in the providing step.

9. A reproducing method comprising:

a reproducing step of reproducing information data of a plurality of pieces of video data and a plurality of playlists indicating a reproduction order of the video data from a first recording medium;

an output step of outputting the pieces of video data and the plurality of playlists reproduced from the first recording medium to a recording device so as to cause the recording device to record the reproduced video data and the plurality of playlists on a second recording medium;

a selecting step of selecting one of the plurality of playlists on the first recording medium;

providing an instruction by a user;

a discriminating step of, in accordance with an instruction for copying the plurality of video data designated by the selected playlist from the first recording medium to the second recording medium, discriminating whether the plurality of video data designated by the selected playlist can be recorded on substantially the same recording position on the second recording medium as a physical recording position on the first recording medium where the plurality of video data designated by the selected playlist is recorded; and a control step of controlling the recording position of the video data on the second recording medium according to a discrimination result of the discrimination means in the copy mode, wherein when it is discriminated in the discriminating step that the plurality of video data can be recorded on substantially the same recording position, the control step includes controlling the recording device to record the plurality of video data designated by the selected playlist on substantially the same recording position on the second recording medium as a physical recording position on the first recording medium where the video data designated by the selected playlist is recorded in the copy mode, and wherein when it is discriminated in the discriminating step that the video data cannot be recorded on substantially the same recording position, the control step includes inquiring whether the plurality of video data designated by the selected playlist are to be copied on a free space of the second recording medium, after inquiring, controlling the recording device to record the plurality of video data on a free space of the second recording medium while keeping a relative recording position of the plurality of video data designated by the selected playlist on the first recording medium in accordance with an instruction for executing the copying provided in the providing step, and stopping the copying in accordance with an instruction for stopping the copying provided in the providing step.

* * * * *